(12) United States Patent
Zeh et al.

(10) Patent No.: US 6,773,530 B2
(45) Date of Patent: Aug. 10, 2004

(54) METHOD FOR MANUFACTURING TIRES ON A FLEXIBLE MANUFACTURING SYSTEM

(75) Inventors: Ronald Bert Zeh, Holzthum (LU); John Kolbjoern Roedseth, Bissen (LU); Michel Lemaire, Habay-la-Neuve (BE); Bryan John McCoy, Koerich (LU); Francesco Sorce, Oberpallen (LU); Fabrice Harry Martin, Virton (BE)

(73) Assignee: The Goodyear Tire & Rubber Company, Akron, OH (US)

( * ) Notice: Subject to any disclaimer, the term of this patent is extended or adjusted under 35 U.S.C. 154(b) by 312 days.

(21) Appl. No.: 09/957,785

(22) Filed: Sep. 21, 2001

(65) Prior Publication Data

US 2003/0056877 A1 Mar. 27, 2003

(51) Int. Cl.⁷ .............................................. B29D 30/08

(52) U.S. Cl. ........................ 156/111; 156/123; 156/133; 156/396; 156/405.1

(58) Field of Search ................................. 156/111, 123, 156/133, 396, 405.1, 406.4, 406.2

(56) References Cited

U.S. PATENT DOCUMENTS

| | | | |
|---|---|---|---|
| 1,818,955 A | | 8/1931 | Maas |
| 1,964,363 A | * | 6/1934 | Ostling et al. .............. 156/111 |
| 2,319,643 A | | 5/1943 | Sternad et al. |
| 2,818,907 A | * | 1/1958 | Sapp ........................ 156/396 |
| 3,157,542 A | * | 11/1964 | Trevaskis .................... 156/111 |
| 3,318,745 A | | 5/1967 | Black et al. |
| 3,355,346 A | | 11/1967 | Black et al. |
| 3,389,032 A | | 6/1968 | Black et al. |
| 3,795,563 A | | 3/1974 | Enders et al. |
| 3,832,261 A | | 8/1974 | Brey et al. |
| 4,197,155 A | | 4/1980 | Hursell, Sr. |
| 4,276,104 A | * | 6/1981 | Riggs ........................ 156/123 |
| 4,392,899 A | | 7/1983 | Bertoldo |
| 4,443,290 A | * | 4/1984 | Loeffler et al. ............. 156/396 |
| 4,618,303 A | | 10/1986 | Irie |
| 4,747,904 A | | 5/1988 | Okuyama et al. |
| 4,933,033 A | | 6/1990 | Bailey |
| 4,985,100 A | | 1/1991 | Sasaki et al. |

(List continued on next page.)

FOREIGN PATENT DOCUMENTS

| | | |
|---|---|---|
| DE | 1904481 | 8/1970 |
| DE | 195 44 369 | 6/1997 |
| EP | 0105048 | 4/1984 |
| EP | 0246497 | 11/1987 |
| EP | 0448407 | 9/1991 |
| EP | 0555813 | 8/1993 |
| EP | 0623451 | 4/1994 |

OTHER PUBLICATIONS

U.S. patent application Ser. No. 09/960,078, LeMaire et al., filed Sep. 21, 2001.

U.S. patent application Ser. No. 09/957,740, Durand et al., filed Sep. 21, 2001.

U.S. patent application Ser. No. 09/957,731, LeMaire et al., filed Sep. 21, 2001.

*Primary Examiner*—Geoffrey L. Knable
(74) *Attorney, Agent, or Firm*—Howard M. Cohn

(57) ABSTRACT

A method for simultaneously building a plurality of tire carcasses includes the tire building steps of establishing a sequence of work stations, each at a predefined location along a working axis extending through the work stations. Disconnected tire building drums are advanced along the working axis extending through the work stations. The tire building drums are coupled to an intake server at each of the work stations for operating the tire building drums. One or more tire components are applied to the tire building drums at each of the work stations.

16 Claims, 5 Drawing Sheets

U.S. PATENT DOCUMENTS

| | | |
|---|---|---|
| 5,082,519 A | 1/1992 | Klose et al. |
| 5,156,713 A | 10/1992 | Ishii et al. |
| 5,190,605 A | 3/1993 | Holroyd et al. |
| 5,213,651 A | 5/1993 | Fukamachi et al. |
| 5,354,404 A | 10/1994 | Benjamin |
| 5,399,225 A | 3/1995 | Miyamoto et al. |
| 5,411,626 A | 5/1995 | Coretta et al. |
| 5,613,414 A | 3/1997 | Murphy et al. |
| 5,882,457 A | 3/1999 | Currie et al. |
| 5,948,207 A | 9/1999 | Huisman et al. |
| 6,004,414 A | 12/1999 | Tabuchi et al. |
| 6,074,329 A | 6/2000 | Hirano et al. |
| 6,139,668 A | 10/2000 | Stokes et al. |

* cited by examiner

METHOD FOR MANUFACTURING TIRES ON A FLEXIBLE MANUFACTURING SYSTEM

CROSS-REFERENCE TO RELATED APPLICATIONS

This application relates to U.S. Patent application entitled PRECISION LONGITUDINAL REGISTRATION OF TIRE BUILD DRUM TO FMS WORK STATION, and filed on an even date herewith.

This application relates to U.S. Patent application entitled PRECISION ALIGNMENT OF TIRE BUILDING DRUM TO AUTOMATED TIRE BUILDING SYSTEM WORKING AXIS, and filed on an even date herewith.

This application relates to U.S. Patent application entitled EXPANDABLE TIRE BUILDING DRUM WITH ALTERNATING FIXED AND EXPANDABLE SEGMENTS, AND CONTOURS FOR SIDEWALL INSERTS, and filed on an even date herewith.

This application relates to U.S. Patent application entitled BEAD LOADING METHOD AND APPARATUS, and filed on an even date herewith.

TECHNICAL FIELD OF THE INVENTION

The present invention relates to automated tire building machines and, more particularly, to methods and apparatus for simultaneously assembling a plurality of tires on a plurality of tire building drums moving along an assembly path with work stations disposed along the assembly path.

BACKGROUND OF THE INVENTION

It is known that in making vehicle tires, for example for automobiles, that manufacture of a so-called carcass is first achieved by successively assembling several different components.

In other words, the different carcass types included in a production range can be distinguished from one another depending on the presence thereon of the various accessory components and/or the typology of the accessory components themselves.

By way of example, when carcasses for tubeless tires are to be produced, that is tires that in use do not require the presence of an inner tube, the main components can be considered to include a so-called "inner liner" that is a layer of elastomeric air-impervious material, a carcass ply, a pair of annular metal elements, commonly referred to as bead cores, around which the opposite ends of the carcass ply are folded as well as a pair of sidewalls made of elastomeric material, extending over the carcass ply at laterally opposite positions. The accessory components may in turn comprise of one or more additional carcass plies, one or more reinforcing bands for overlying the carcass ply or plies at the areas turned up around the bead cores (chafer strips), and others.

As disclosed in U.S. Pat. No. 5,554,242, two stage tire building with a first stage tire building drum in combination with a second stage tire building drum is well known and established in the art with the building drums being both in line and offset from each other. It is further known to have two-stage tire building with a single drum swinging between the first stage position and second stage position where a band builder is in line with the first stage building drum. For this system, individual breaker application and single piece tread rubber are applied at the second Stage while components such as apex chafers and Shoulder wedges are applied at the first stage. The above components are made in separate operations and stored for use as needed in the two-stage building process.

While the two-stage building process in its separate stages accommodated servers for the various components, it presented the problems of requiring a large work area for the two separate positions and the need to coordinate the separate functions as well as bringing all of the components together at the proper stations. As a result, the components were often stored and became subject to aging, sometimes losing their tack, for example, during the handling or the individually applied components. Moving the tire subassemblies from one stage to another has been a highly labor intensive operation even with the use of mechanical servers to assist operators in placing the components on the tire on the first and second stage drums. As a result, the operation was costly.

U.S. Pat. No. 5,354,404 discloses a system for assembling green tires with a two stage process where the assembly is automatic and requires a small amount of floor space. While this system, has overcome some floor space problems, its out put is still limited.

It has been known in the prior art, as disclosed in U.S. Pat. No. 2,319,643, to manufacture tires on a line with a plurality of building drums that are chucked up at each station.

Also, as disclosed in U.S. Pat. No. 1,818,955, tires can be manufactured on a line with a plurality of building drums "arranged in a train or series and connecting means is provided for translating the cores from one device to the next." The connectivity between the tire cores leads to the inability to change the machine to accommodate various sized tire constructions. U.S. Pat. No. 3,389,032 also discloses a system using a large number of building drums which are interconnected.

Further, as disclosed in U.S. Pat. No. 5,354,404, there is illustrated another system for manufacturing tires on a line with a plurality of building drums "arranged in a train or series and connecting means is provided for translating the cores from one device to the next." The connectivity between the tire cores leads to the inability to change the machine to accommodate various sized tire constructions.

In modern production processes, the assembling of the different components is carried out in automated plants including a plurality of assembling drums moved following a precise working sequence in accordance with the manufacturing process to be executed. For example, as disclosed in U.S. Pat. No. 5,411,626, these plants can consist of a plurality of work stations disposed consecutively in side by side relation, each of which lends itself to carry out the application of a predetermined component onto the assembling drums that in turn are brought in front of it.

EPO 0105048 discloses a tire assembly means employing a conveyor to transport a plurality of tire building drums to a plurality of applicator stations wherein various components are applied to the tire building drums at the various applicator stations in order to fabricate a tire when the tire building drums have made a complete transversal of the conveyor, wherein the tire building drums are maintained in an angled relationship with respect to the conveyor and the applicator stations.

In particular there are primary work stations intended for application of the main components, which are always active, irrespective of the carcass type being produced. Alternated with the various primary work stations there are one or more auxiliary, work stations, intended for application of accessory components, if required. The activation or deactivation state of these auxiliary stations depends on the carcass type in progress of manufacture. The problem with these prior art manufacturing systems is that the location and position of the building drums was not precise enough to ensure that the tires being constructed were of adequate uniformity for the requirements of present day high performance tires. That is, while the tire building drums moving along the assembly path were stopped at a stop position at each work position, there is no teaching or suggestion of how the position of the tire building drum was at positioned at a precise position. Further, it appears that the power to operate each building drum was carried aboard each drum. This would suggest that each drum is more complicated and expensive to produce.

It is well known that the components of most pneumatic tire constructions must be assembled in a way which promotes good tire uniformity in order to provide proper tire performance. For example, a tread which "snakes" as it goes around the tire circumference will cause wobbling as the tire is operated. For example, a carcass ply which is lopsided (longer cords on one side of the tire than the other side) can cause a variety of tire non-uniformity problems including static imbalance and radial force variations. For example, a tire which is not meridionally symmetric (e.g., tread not centered between beads) can cause a variety of tire non-uniformity problems including couple imbalance, lateral force variations, and conicity. Therefore, in order to meet typical tire performance requirements, the tire industry generally expends considerable effort in producing tires with good uniformity. Tire uniformity is generally considered to mean tire dimensions and mass distributions which are uniform and symmetric radially, laterally, circumferentially, and meridionally, thereby producing acceptable results for measurements of tire uniformity including static and dynamic balance, and also including radial force variation, lateral force variation, and tangential force variation as measured on tire uniformity machines which run the tire under load on a road wheel.

Although certain degrees of tire non-uniformity can be corrected in post-assembly manufacturing (e.g., by grinding), and/or in use (e.g., applying balance weights to the rim of a tire/wheel assembly), it is preferable (and generally more efficient) to build-in tire uniformity as much as possible. Typical tire building machines comprise a tire build drum around which the tire components are wrapped in successive layers including, for example, an inner liner, one or more carcass plies, optional sidewall stiffeners and bead area inserts (e.g., apex), sidewalls and bead wire rings (beads). After this layering, the carcass ply ends are wrapped around the beads, the tires are blown up into a toroidal shape, and the tread/belt package is applied. Typically the tire build drum is in a fixed location on the plant floor, and the various layers of components are applied manually or automatically using tooling registered to reference points on the fixed drum in order to ensure component placement with the desired degree of precision. The tooling is generally fixed relative to the tire build drum, for example a guide wheel on an arm extending from the same frame (machine base) which supports the tire build drum.

The prior art, as discussed herein still has problems of enabling the building of tires with complicated construction, such as runflat tires, to be built on a single manufacturing line that is capable of being easily changed to accommodate different constructions sizes.

BRIEF SUMMARY OF THE INVENTION

According to the present invention there is disclosed a method for simultaneously building a plurality of tire carcasses. The method comprises the tire building steps of establishing a sequence of at least three and up to ten work stations; advancing at least three disconnected tire building drums along a working axis extending through the at least three work stations; and applying one or more tire components to the tire building drums at each of the work stations. Then the resulting green tire carcass is removed at the last of the work stations. Finally, the tire building drum is advanced from the last work station after the green carcass has been removed to the first work station.

Also, according to the invention, the belt and tread package is disposed about the green tire carcass, expanding the tire carcass into a tread and belt to form a green tire.

According to the invention, the tire building drums are disconnected from each other and independently advanced along the linear working axis extending between the work stations. Each of the disconnected tire building drums are individually advanced along the working axis so that the axis of rotation of each tire building drums remains aligned with the linear working axis.

According to the invention, the plurality of disconnected tire building drums can be simultaneously advanced along a working axis with individual, self propelled devices to which the tire building drums are mounted from one work station to another. The tire building drums are advanced along the working axis so that an axis of rotation through the building drum is maintained at a constant predetermined height and location and in parallel alignment with the working axis.

According to the invention, an intake server is located at each of the work stations for operating the tire building drums. The intake servers are coupled to the building drums while maintaining the axis of rotation through the building drums at the constant predetermined height and location and in parallel alignment with the working axis. The intake server at each of the work stations move from their normally retracted position outward across the working axis into a position to couple to that tire build drum. Then the building drums are uncoupled from the intake servers after the tire component(s) have been applied to the building drums. Next, the intake server at each of the work stations are retracted to their normally retracted position, prior to the now uncoupled tire building drum advancing to the next work station.

According to the invention, step of applying one or more tire components to the tire building drums at each of the work stations includes applying the tire components to the tire building drums while maintaining the axis of rotation through the building drums at the constant predetermined height and location and in parallel alignment with the working axis. This is accomplished by providing one or more application drums at each of the work stations for applying the tire component(s) to the building drums. The application drums are moved from their normal retracted position away from the working axis to a location where the tire components can be applied to the building drums while maintaining the axis of rotation through the building drums at the constant predetermined height and location and in parallel alignment with the working axis. Then the application drums are retracted at each of the work stations to their normally retracted position, prior to advancing the tire building drum to the next work station.

Other objects, features and advantages of the invention will become apparent in light of the following description thereof.

BRIEF DESCRIPTION OF THE DRAWINGS

Reference will be made in detail to preferred embodiments of the invention, examples of which are illustrated in the accompanying drawing figures. The figures are intended to be illustrative, not limiting. Although the invention is generally described in the context of these preferred embodiments, it should be understood that it is not intended to limit the spirit and scope of the invention to these particular embodiments.

Certain elements in selected ones of the drawings may be illustrated not-to-scale, for illustrative clarity. The cross-sectional views, if any, presented herein may be in the form of "slices", or "near-sighted" cross-sectional views, omitting certain background lines which would otherwise be visible in a true cross-sectional view, for illustrative clarity.

Figure 1:
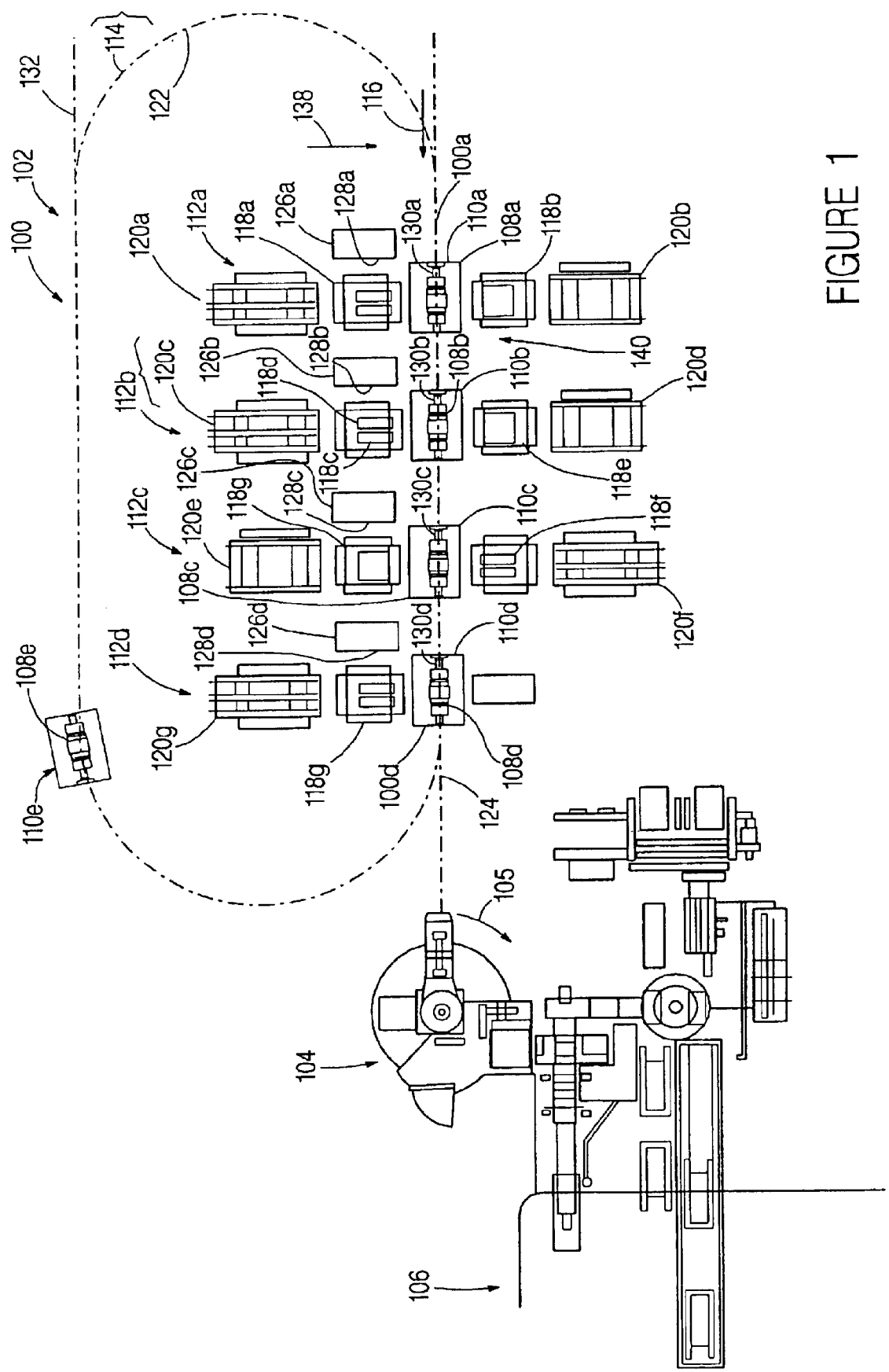
Figure 1B:
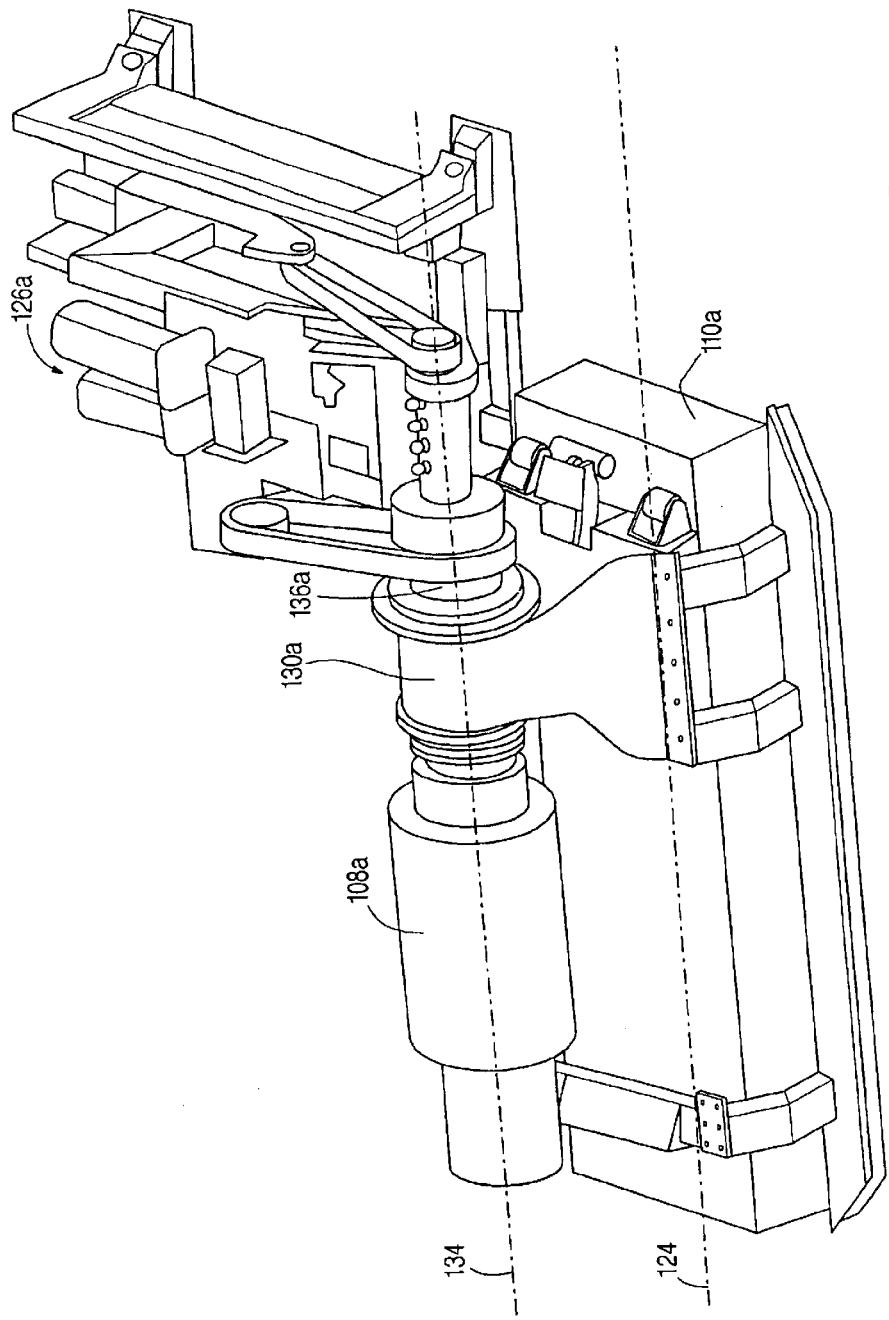
Figure 1C:
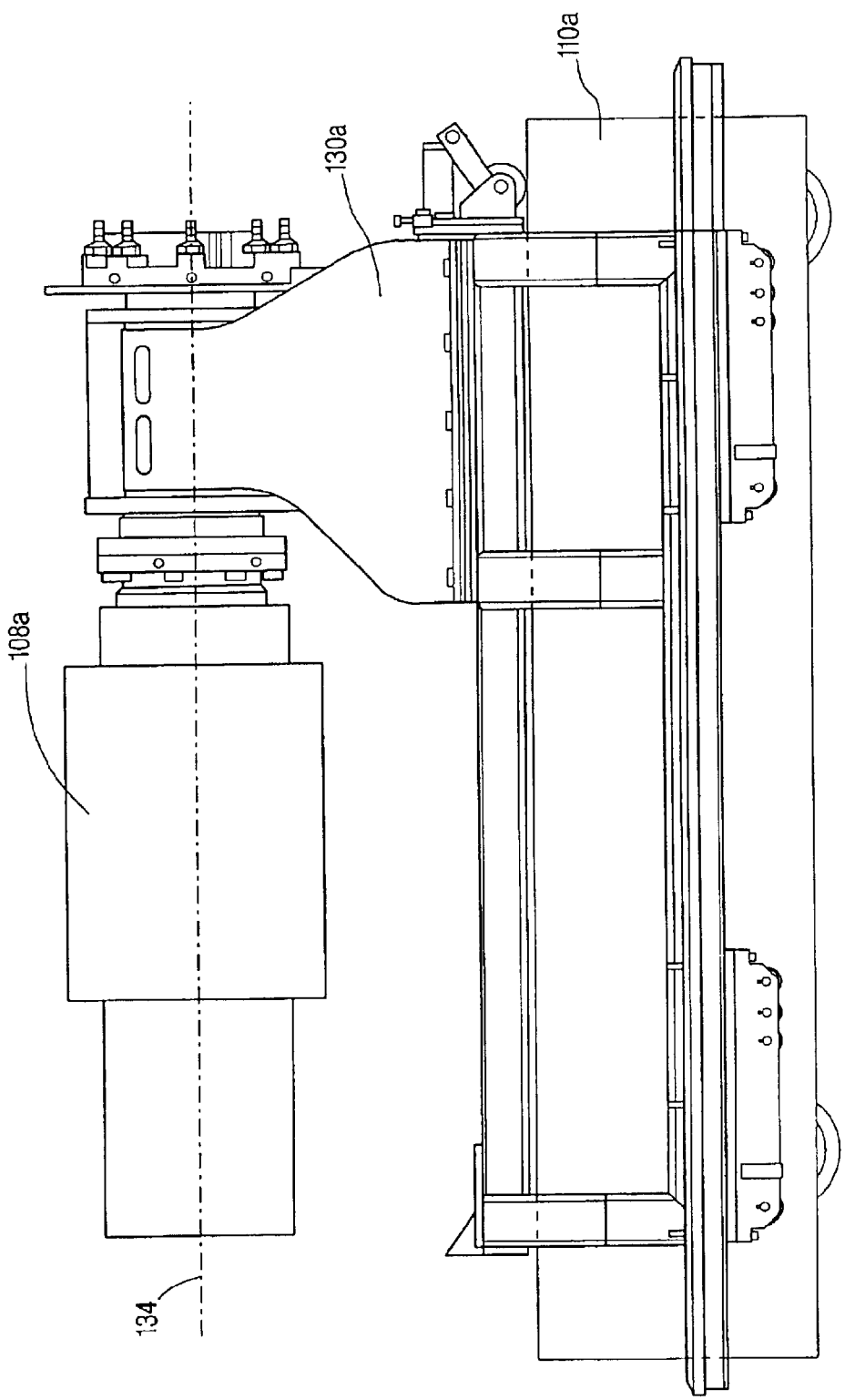
Figure 1D:
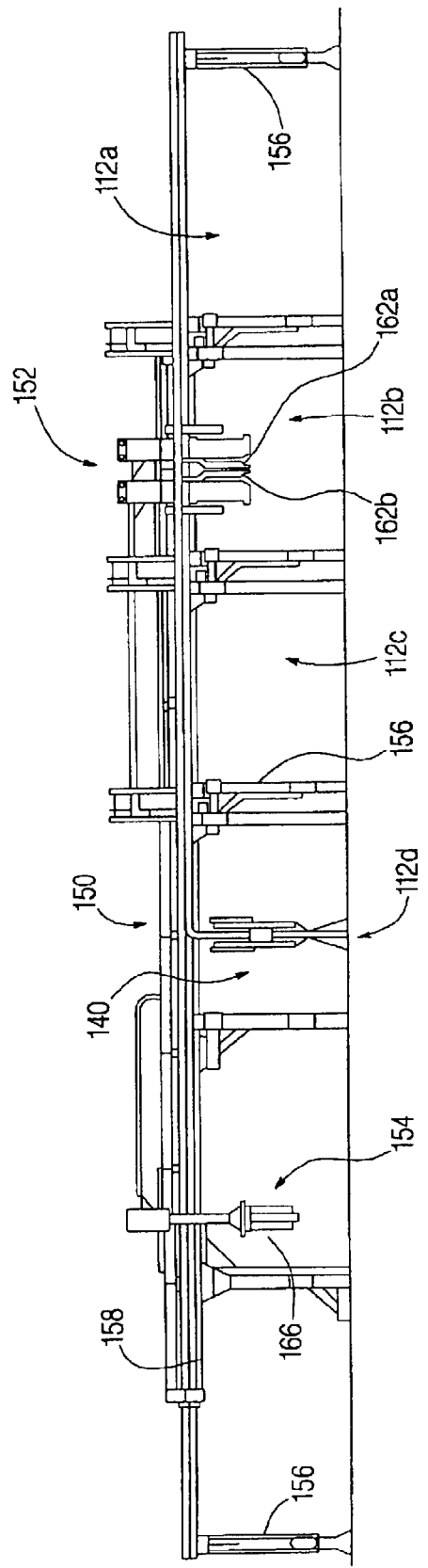
Figure 2:
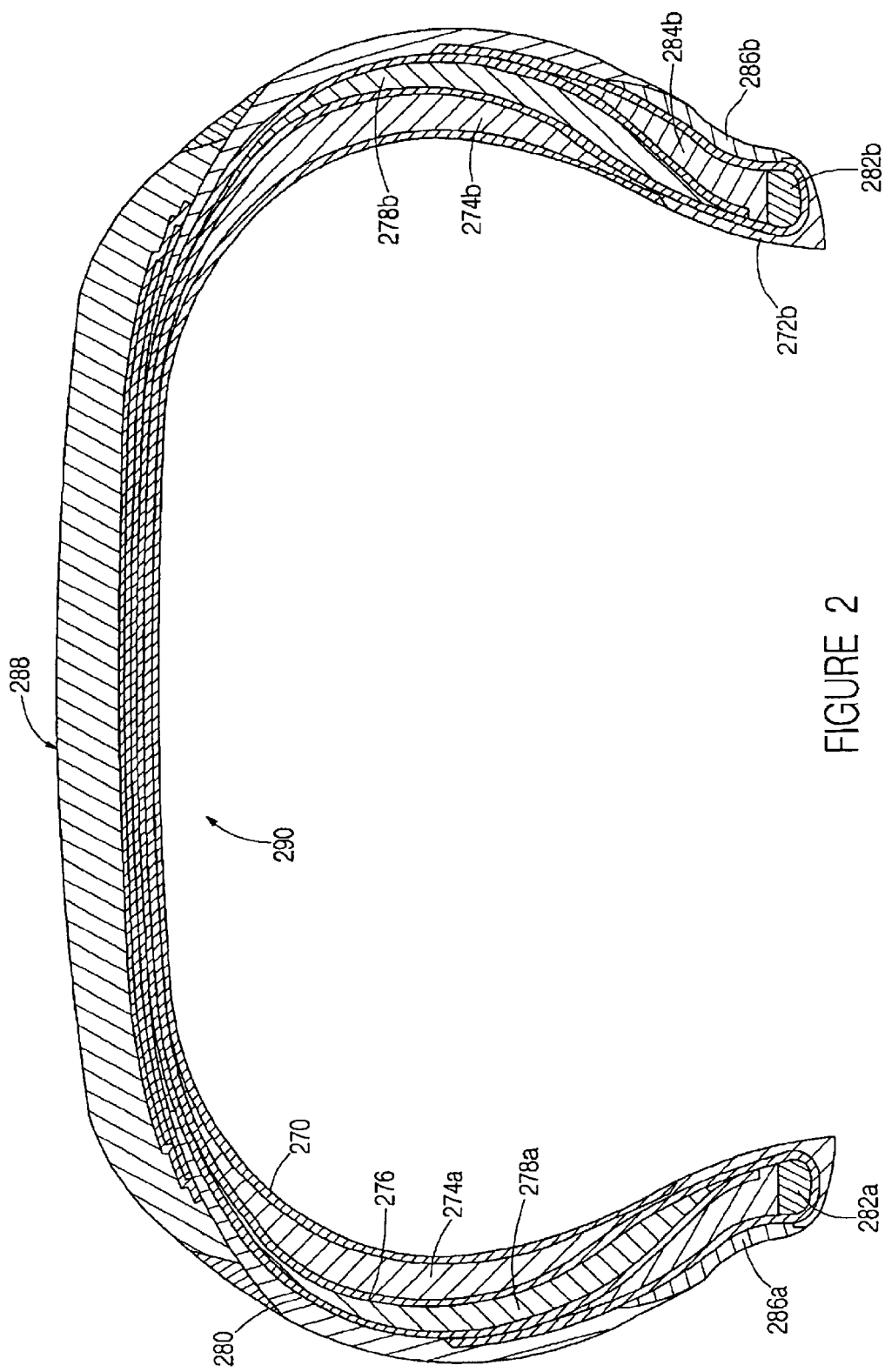

The structure, operation, and advantages of the present preferred embodiment of the invention will become further apparent upon consideration of the following description taken in conjunction with the accompanying drawings, wherein:

FIG. 1A is a schematic view of an automated tire building machine, according to the invention;

FIG. 1B is a perspective view of a workstation of the FMS showing a tire build drum coupled to an intake station, according to the invention;

FIG. 1C is a side view of a tire build drum on a drum support frame, according to the invention;

FIG. 1D is a schematic view an overhead structure incorporating a bead loading system, a bead setting system and a carcass transfer apparatus used in conjunction with the automated tire building machine of FIG. 1A; and FIG. 2 is a cross section of a typical runflat tire construction that can be produced with the present invention.

DEFINITIONS

The following terms may be used throughout the descriptions presented herein and should generally be given the following meaning unless contradicted or elaborated upon by other descriptions set forth herein.

"Apex" (also "Bead Apex") refers to an elastomeric filler located radially above the bead core and between the plies and the turnup plies.

"Axial" and "axially" refers to directions that are on or are parallel to the tire's axis of rotation.

"Axial" refers to a direction parallel to the axis of rotation of the tire.

"Bead" refers to that part of the tire comprising an annular substantially in extensible tensile member, typically comprising a cable of steel filaments encased in rubber material.

"Belt structure" or "reinforcement belts" or "belt package" refers to at least two annular layers or plies of parallel cords, woven or unwoven, underlying the tread, unanchored to the bead, and having both left and right cord angles in the range from 18 to 30 degrees relative to the equatorial plane of the tire.

"Breakers" or "tire breakers" refers to a belt or belt structure or reinforcement belts.

"Carcass" refers to the tire structure apart from the belt structure, tread, undertread over the plies and the sidewalls, but including the beads, plies, and, in the case of EMT or runflat tires, the wedge inserts sidewall reinforcements.

"Casing" refers to the carcass, belt structure, beads, sidewalls and all other components of the tire excepting the tread and undertread.

"Chafer" refers to reinforcing material (rubber alone, or fabric and rubber) around the bead in the rim flange area to prevent chafing of the tire by the rim parts.

"Chipper" refers to a narrow band of fabric or steel cords located in the bead area whose function is to reinforce the bead area and stabilize the radially inwardmost part of the sidewall.

"Circumferential" refers to circular lines or directions extending along the perimeter of the surface of the annular tread perpendicular to the axial direction, and can also refer to the direction of sets of adjacent circular curves whose radii define the axial curvature of the tread, as viewed in cross section.

"Cord" refers to one of the reinforcement strands, including fibers or metal or fabric, with which the plies and belts are reinforced.

"Crown" or "tire crown" refers to the tread, tread shoulders and the immediately adjacent portions of the sidewalls.

"EMT tire" refers to Extended Mobility Technology and EMT tire refers to a tire which is a "runflat", which refers to a tire that is designed provide at least limited operational service under conditions when the tire has little to no inflation pressure.

"Equatorial plane" refers to a the plane perpendicular to the tire's axis of rotation and passing through the center of its tread, or midway between the tire's beads.

"Gauge" refers generally to a measurement, and often to a thickness dimension.

"Inner liner" refers to the layer or layers of elastomer or other material that form the inside surface of a tubeless tire and that contain the inflating gas or fluid within the tire. Halobutyl, which is highly impermeable to air.

"Insert" refers to the crescent-shaped or wedge-shaped reinforcement typically used to reinforce the sidewalls of runflat-type tires; it also refers to the elastomeric non-crescent-shaped insert that underlies the tread; it is also called a "wedge insert."

"Lateral" refers to a direction parallel to the axial direction.

"Meridional profile" refers to a tire profile cut along a plane that includes the tire axis. "Ply" refers to a cord-reinforced carcass reinforcing member (layer) of rubber-coated radially deployed or otherwise parallel cords.

"Pneumatic tire" refers to a laminated mechanical device of generally toroidal shape (usually an open-torus) having two beads, two sidewalls and a tread and made of rubber, chemicals, fabric and steel or other materials.

"Shoulder" refers to the upper portion of sidewall just below the tread edge.

"Sidewall" refers to that portion of a tire between the tread and the bead.

"Tire axis" refers to the tire's axis of rotation when the tire is mounted to a wheel rim and is rotating.

"Tread cap" refers to the tread and the underlying material into which the tread pattern is molded.

"Turn-up end" refers to a portion of a carcass ply that turns upward (i.e., radially outward) from the beads about which the ply is wrapped.

DETAILED DESCRIPTION OF THE INVENTION

As shown in FIG. 1A, there is disclosed a flexible, automatic tire building system 100 that includes a first stage tire building system 102 and a second stage building system 106. As described in greater detail below, a tire carcass is built on each of a plurality of tire building drums 108a, 108b, 108c, 108d, 108e (collectively referred to as "108") as they advance through the first stage building system 102. Concurrently, with the building of the tire carcass on each tire building drum 108, a belt package covered with a tread is built at the second stage building machine 106. A transfer device (not shown) removes each fully built tire carcass from the tire building drum 108 at the last station of the first stage building system 102 and moves the fully built tire carcass onto a shaping turret 104. Then the shaping turret is moved to a second location, as indicated by arrow 105, and another transfer ring (not shown) moves the completed belt-tread package over the green tire carcass already on the shaping turret 104. Next, the green tire carcass is blown up into the belt-tread package to form a green tire. The green tire is removed from the shaping turret 104 and sent, typically by a conveyor (not shown) to be molded.

There are an number of advantages achieved by the flexible, automatic tire building system 100 of the present invention which overcome problems and limitations of prior art systems as described hereinbefore. First, tire building system 100 can be easily and quickly modified to include more or less work stations depending on the complexity of the tire being built. Also, the configuration and number of tire building drums can be changed to accommodate the building of tires of different sizes and constructions. Further, the drums that apply the material to the building drums can be easily modified to accommodate different sized materials depending on the particular construction of the tires being built. These and other improvements will be discussed in detail below.

As shown in FIG. 1A, the first stage building system 102 incorporates a sequence of at least three and up to ten work stations, such as stations 112a, 112b, 112c, 112d (collectively referred to as "112"), for applying one or more tire components onto the tire building drums 108 at each of the work stations. Individual, self propelled devices typically called automated guided vehicles (AGVs) 110a, 110b, 110c, 110d, 110e (collectively referred to as "110") each having one of the building drums 108 attached thereto, are used to advance the building drums through the first stage building system 102. The tire build drums 108 are rotatably supported by a drum support 130a, 130b, 130c, 130d, 130e (collectively referred to as "130"), respectively, which in turn mounts to its respective AGV 110. The tire build drums 108 rotate with respect to the drum support 130 about an axis of rotation 134. The AGVs 110 operate independently from each other and are not connected to each other and are remotely guided along a work path 114, shown as an oval loop. Also, the building drums 108, each mounted to an AGV, are not connected to each other. The work path 114 can have any desired configuration, as discussed in more detail below. The work path 114 includes a straight, linear working axis 124 extending through the work stations 112, in the direction of arrow 116. The AGVs 110 function to independently advance the disconnected tire building drums 108 around the work path 114 and specifically along the linear working axis 124 extending through the work stations 112 so that one or more tire components can be applied to the tire building drums at each station. Preferably, each of the AGVs 110 reach the work stations 112 at the same time. However, while it is not a necessary requirement that the AGVs 110 reach the work stations at the exact same time, it is important that the AGVs do not collide with each other. For example, AGV 110a reaches station 112a, at the same time that AGVs 110b, 110c, 110d reach work stations 112b, 112c, 112d, respectively. Because of the extra distance along the loop of the working path 114 from the last work station 112d to the first work station 112a, as compared to the distance between the other work stations, i.e., 112a to 112b, an additional AGV 110e with building drum 108e, as shown in FIG. 1A, can be provided to increase the speed of the movement of the building drums 108 around the working path.

Each work station 112 includes application drums 118a, 118b, 118c, 118d, 118e, 118f, 118g (collectively referred to as "118"), supply reels 120a, 120b, 120c, 120d, 120e, 120f, 120g (collectively referred to as "120"), and intake servers 126a, 126b, 126c, 126d (collectively referred to as "126"), respectively.

The intake servers 126 at each work station 112 are normally in a retracted position, as shown in FIG. 1A, spaced back from the working axis 124. When a tire building drum 108 is initially advanced to a work station 112 by an AGV 110, the intake server 126 moves outward in the direction of arrow 138 across the working axis 124 and couples to that tire build drum 108 then disposed at that work station. The intake servers 126 function to provide power to control and operate the tire building drums 108. In addition, the coupling of the intake server 126 to the tire building drum 108 establishes a precise, longitudinal position for the tire build drum with respect to the intake server 126. In addition, the axis of revolution 134 of the building drums 108 are maintained parallel to the axis of rotation 123 through the application drums 118 when the building drums are located in the work station 112. The longitudinal positioning of the building drums 108 occurs without changing the location of the axis of rotation 134 through the building drums 108 which is maintained at a constant predetermined height and location and in parallel alignment with the working axis 124. Preferably, the axis of rotation 134 through the building drums 108 is co-linear with the working axis 124 as the building drums are advanced through and between the first and last work stations 112a to 112d, respectively. After the tire building component(s) are applied to the tire building drum, as discussed in more detail hereinafter, the intake servers 126 are uncoupled from the building drums 108 and returned to their retracted position, as shown in FIG. 1A, so that the AGVs 110 can continue their movement, unrestricted, along the work path 114.

The axis of rotation 123 through application drums 118 are precisely aligned vertically and horizontally to the working axis 124. This insures that when the application drums 118 move inward toward the building drums 108, when the later are in the work station, the tire building component will be precisely applied to the building drums as discussed hereinafter. Also, the application drums 118 are precisely positioned longitudinally along the working axis 124 relative to a longitudinal reference point 128a, 128b, 128c, 128d (collectively referred to as "128"), established for each work station 112, such as for example, the longitudinal reference point 128 on a forward surface of the intake servers 126. The application drums 118 are normally disposed away from the working axis 124 so that the AGVs 110 can pass each of the work stations 112 in the first stage building system 102 without contacting the application drums.

After the tire building drums 108 are positioned longitudinally along the working axis 124 relative to a longitudinal reference point 128a, 128b, 128c, 128d (collectively referred to as "128") established for each work station 112, the application drums 118 can move forward towards the working axis 124 so that the tire component previously applied on the outer circumference of the application drum, as discussed hereinafter, is pressed against the outer circumferential surface of the tire building drums 108. Then, the rotation of the building drums transfers the tire component from the application drums 118 to the building drums 108. An important feature of the invention is that the tire components are applied to the tire building drums 108 while maintaining the axis of rotation 134 through the building drums at the constant predetermined height and location and in parallel co-linear alignment with the working axis 124.

Once the tire component is transferred onto the tire drum 108, the application drum 118 can with retract to its initial position so that the tire building drum can receive another tire component from an application drum on the opposite side of the working axis 124 or move onto the next work station 112. The application drums 118 can be of different constructions depending on the specific tire component being applied to the building drums 108. Typically, different tire components are applied at each work station 112 as the building drums 108 move through a sequence of steps beginning at the first work station 112a and ending at the last work station 112d, in the present configuration.

The supply reels 120 have tire components wound thereon and are disposed directly behind their respective application drums 118, as shown in FIG. 1A. Typically, a desired length of tire component can be unwound from a supply reel 120 and wound onto the outer circumferential surface of an adjacent application drum 118. Once the supply reel 120 is empty, another full reel can easily be brought into place so that the FMS system 100 continues to operate.

As illustrated in FIG. 1A, the preferred embodiment of the tire building system 100 incorporates a plurality of independently movable, self-powered AGVs 110, for individually advancing the tire build drums 108 carried on each between the work stations 112 in the direction shown by arrow 116. The AGVs 110, as shown in FIG. 1A, have the tire build drums 108 attached thereto by a drum support 130a, 130b, 130c, 130d (collectively referred to as "130"). The AGVs 110 follow the work path 114 defined by a guide wire 122 embedded in the plant floor. The work path 114, as shown in FIG. 1A, is an oval path passing through the work stations 112 from a first work station 112a to a last work station 112d, and then looping back around to the first work station 112a. The work stations 112 are aligned to and spaced along a common, linear working axis 124, which extends along the work path 114 from the first work station 112a to the last work station 112d. The AGV guide wire 122, which provides a control signal to the AGVs 110, is substantially parallel to the working axis 124 when the guide wire 122 passes through the work stations 112. While the work path 114 is shown as looping back in one direction, it is also within the terms of the present invention to provide an additional loop (not shown) similar to the loop formed by work path 114 looping back on the opposite side of the automatic tire building system 100 from work path 114, as now shown. Moreover, there can be provided spurs 132 from the work path 114 onto which the AGVs 110 can be moved for service, storage, recharging or any other need. Although self-powered, and automated to follow the guide wire 122, the AGVs 110 are also subject to external control, for example by radio signal and/or proximity switches, so that the AGVs can be controlled to stop at each work station 112 for a suitable amount of time before proceeding to the next work station 112 or for moving them onto the spur 132 or to some other part of the factory floor as needed.

Referring to FIG. 1D, there is illustrated a view of an overhead structure 150 which incorporates a bead loading and bead setting system 152 and carcass transfer apparatus 154. The overhead structure 150 includes a plurality of support columns 156, disposed to provide space for the working stations 112a, 112b, 112c, 112d, as shown in FIG. 1A. A rail 158 is mounted to the support columns 156 and extends from the first work station to a distance past the last work station 112d.

The bead setting system 152 includes a pair of bead setters 162a and 162b that move along the rail 158. The bead setting system 152 also includes a bead loader 140, as shown in FIG. 1D for mounting the beads onto the bead setters 162a and 162b. The bead setters 162a and 162b move along the rail 158 and place the beads onto the building drums 108 and also set the beads onto the building drums 108 moving through the first stage building system 102, as discussed in more detail herein below.

The carcass transfer apparatus 154 that moves along the rail 158 and includes a grab ring device 166 that slides onto and removes the finished tire carcass from the building drum 108 in working station 112d. The grab ring device 166 then moves toward the carcass transfer device 104 where the tread and belt package are placed over the tire carcass.

An exemplary sequence of operations for building a green tire carcass on a tire building system 100 is as follows. For the first step of a green tire carcass building process, the AGV 110a advances an empty tire build drum 108a along the working axis 124 so that an axis of rotation 134 through the building drum 108a is in parallel alignment with the working axis 124. Moreover, as the building drum 108a moves through working stations 112a–112d, the axis of rotation 134 through the building drum 108a is maintained at a constant, predetermined height so that an axis of rotation 134 through the building drum 108a is always at a constant predetermined location with the working axis 124 through the first stage machine 102. The building drum 108a advances into the first work station 112a and stops so that the building drum is approximately at a desired stopping point past the intake server 126a. Then, the intake server 126a moves outward in the direction of arrow 138 towards the working axis 124 until a coupling head 136a, 136b, 136c, 136d of the intake server, as shown in FIG. 1B is aligned with the drum support 130a. The coupling head 136a of intake server 126a next couples to the tire build drum 108a so that the build drum is in a precise longitudinal position along the working axis 124 while retaining the parallel alignment of the axis of rotation 134 with working axis 124. In the preferred embodiment, power and control signals are communicated to/from the tire build drum 108 by the intake server 126.

Next the application drum 118b can move outward in the direction of arrow 141 towards the working axis 124 until the tire component, already unwound from a supply reel 120b onto the outer circumferential surface of the application drum, engages the outer circumferential surface of the tire building drum 108a. The building drum 108a then rotates so that the first layer of a tire component, such as an inner liner 270, is applied to the drum. Next, the application drum 118a is retracted to its initial position and the (double) application drums 118a move outward in the direction of arrow 138 toward the working axis 124 until a pair of toe guards 272a, 272b, already unwound from the (double) supply reels 120b, are pressed against the inner liner 270 already applied to the outer circumferential surface of the building drum 108a. The building drum 108a then rotates so that the toe guards are applied to the inner liner on the drum. Next, the application drum 118 is retracted to its initial position.

When the application processes are completed in workstation 112a, the intake server 126a releases the tire build drum 108a to the AGV 10a, uncouples and retracts to a position clear of the path of the AGVs 110 and tire build drums 108, thereby allowing the AGV 110a to advance the tire build drum 108a to the next work station 112b. In order to clear the way, all AGVs 110 present in workstations 112 must move approximately simultaneously. As previously mentioned, the AGVs 110 are not connected to each other and the building drums 108 are not connected to each other.

For the next step of the green tire carcass building process, the AGV 110a propels the tire build drum 108a into the second work station 112b whereupon operations similar to those described for the first work station 110a are performed. That is, the intake server 126b moves outward in the direction of arrow 138 towards the working axis 124 and couples to the tire build drum 108a so that the build drum is in precise alignment, as previously discussed. Then, in the construction of the exemplary runflat tire, the tire building drum is shaped to provide two pockets. Next the application drums 118c, 118d can move outward in the direction of arrow 138 towards the working axis 124 until tire insert components 274a, 274b, already unwound from supply reels 120c onto the outer circumferential surface of the application drums, engage the inner liner already applied to the outer circumferential surface of the tire building drum 108a, each above one of the pockets. The building drum 108a then rotates so that the tire inserts 272a, 272b are applied to the inner liner 270 already applied to the building drum. Next, the application drums 118c, 188d are retracted to their initial position and the application drum 118e move outward in the direction of arrow 141 toward the working axis 124 until a first ply component 276, already unwound from the supply reel 120d, is pressed against the inserts 274a, 274b and the inner liner 270 already applied to the outer circumferential surface of the building drum 108a. The building drum 108a then rotates so that the first ply component 276 is applied on the drum. Next, the application drum 118e is retracted to its initial position.

For the next step of the green tire carcass building process, the AGV 110a propels the tire build drum 108a into the third work station 112c whereupon operations similar to those described for the first and second work stations 112a and 112b are performed. That is, the intake server 126c moves outward in the direction of arrow 138 towards the working axis 124 until a coupling head of the intake server couples to the tire build drum 108a so that the axis of rotation 134 of the build drum is in precise alignment with working axis 124.

Next the application drums 118f can move outward in the direction of arrow 141 towards the working axis 124 until the second tire insert components 278a, 278b, already unwound from supply reels 120f onto the outer circumferential surface of the application drums, engage the first ply 276 already applied to the outer circumferential surface of the tire building drum 108a. The building drum 108a then rotates so that the second tire inserts 278a, 278b are applied to the first ply 276 already applied to the drum. Next, the application drums 118f are retracted to their initial position and the application drum 118g moves outward in the direction of arrow 138 toward the working axis 124 until a second ply component 280, already unwound from the supply reel 120e, is pressed against the second tire inserts 278a, 278b and the first ply 276 already applied to the outer circumferential surface of the building drum 108a. The building drum 108a then rotates so that the second ply component 280 is applied on the drum. Next, the application drum 118g is retracted to its initial position.

Further, at work station 112c, the building drum can be shaped again and a pair of beads 282a, 282b with apexes 284a, 284b are set with bead setters 162a, 162b, and the apexes are stitched into place. Continuing, the under liner 270 and the overlying first ply 276 and second ply 280 are turned up over the beads 282a, 282b using conventional turnup bladders (not shown). Depending on the construction, one of the beads can be placed onto the building drum 108 prior to placing the second inserts 278a, 278b onto the building drum. For example, one of the beads can be placed onto the building drum 108 after the tire carcass is removed from the building drum at the last station 112d.

Continuing, the AGV 110a advances the tire build drum 108a into the fourth work station 112d whereupon operations similar to those described for the first, second and third work stations 112a, 112b and 112c are performed. That is, the intake server 126d moves outward in the direction of arrow 138 towards the working axis 124 until a coupling head of the intake server couples to the tire build drum 108a so that the axis of rotation 134 of the build drum is in precise alignment with working axis 124.

Next the application drums 118g can move outward in the direction of arrow 138 towards the working axis 124 until chafer and sidewall components 286a, 286b, already unwound from supply reels 120g onto the outer circumferential surface of the application drums, engage the second ply 280 already applied to the outer circumferential surface of the tire building drum 108a. The building drum 108a then rotates so that the chafer and sidewalls components 286a, 286b are applied into place directly over the location of the beads and stitched to the second ply to form a tire carcass. Next, the application drums 118g are retracted to their initial position.

Once the tire carcass is completed on the first stage building system 102, a carcass transfer mechanism 104 including a transfer ring 166, of the type disclosed in U.S Pat. No. 4,684,422 removes the tire carcass from the building drum 108a at the last work station 112d.

Continuing, building drum 108a advances along the work path 114 from the last station 112d to the first station 112a while all the other drums are simultaneously advanced to the next station from their previous location.

A belt and tread package 288 are build at the second stage machine 106. The belt and tread package 288 are transferred from the second stage machine 106 onto the tire carcass now located at the transfer mechanism 104. The green tire carcass and the tread and belt package are stitched together. Then, the green tire carcass and tread and belt package are blown up to form a green tire 290. The green tire 290, as shown in FIG. 2, is removed from the transfer device 104 and sent, typically by a conveyor (not shown) to be molded.

Although the invention has been illustrated and described in detail in the drawings and foregoing description, the same is to be considered as illustrative and not restrictive in character—it being understood that only preferred embodiments have been shown and described, and that all changes and modifications that come within the spirit of the invention are desired to be protected. Undoubtedly, many other "variations" on the "themes" set forth hereinabove will occur to one having ordinary skill in the art to which the present invention most nearly pertains, and such variations are intended to be within the scope of the invention, as disclosed herein.

What is claimed is:

1. A method for simultaneously building a plurality of green tire carcasses, comprising the tire building steps of:

establishing a sequence of at least first, second and third work stations, each at a predefined location along a working axis extending through the work stations;

advancing at least first, second and third tire building drums, disconnected from each the along the working axis extending through the work stations so that an axis of rotation through the tire building drums is maintained at a constant predetermined height and location and in parallel co-linear alignment with the working axis;

while maintaining the axis of rotation through the tire building drums at the constant predetermined height and location and in parallel co-linear alignment with the working axis, coupling the tire building drums to an intake server at each of the work stations for operating the tire building drums; and applying one or more tire components to the tire building drums at each of the work stations.

2. The method of claim 1 including the steps of:

removing a resulting green tire carcass from a tire building drum at the last of the work stations; and advancing the tire building drum after the green carcass has been removed at the last work station to the first work station.

3. The method of claim 1, including the steps of:

disposing a belt and tread package about the green tire carcass; and expanding the green tire carcass into the tread and belt package to form a green tire.

4. The method of claim 1 including the step of:

independently advancing each of the disconnected tire building drums along the working axis.

5. The method of claim 1, including the step of:

establishing a sequence of between three to ten work stations for performing a corresponding plurality of tire building steps.

6. The method of claim 2 including the step of:

advancing the tire building drum after the green carcass has been removed at the last workstation along a work path from the last of the work stations to the first of the work stations.

7. The method of claim 1 including the step of:

advancing the tire building drums along the working axis with self propelled devices to which the tire building drums are attached.

8. The method of claim 7 including the step of:

simultaneously advancing the self propelled devices to advance the tire building drums from one work station to another.

9. The method of claim 1 including the step of:

moving the intake servers from their normally retracted positions outward across the working axis into a position to couple the intake server to the tire building drum located at the work station.

10. The method of claim 9 including the steps of:

uncoupling the building drums from the intake servers after the tire component(s) have been applied to the tire building drums; and retracting the intake servers to their normally retracted position, prior to the just uncoupled tire building drums advancing to the next work station.

11. The method of claim 1 including the step of:

at each of The work stations, coupling the tire building drum at the work station to the intake server in a way that establishes a precise longitudinal position along the working axis for the tire building drum at the work station.

12. The method of claim 11 wherein:

the step of coupling the tire building drums to the intake server at each of the work stations comprises coupling only one longitudinal end of the tire building drum to the intake server at each of the work stations.

13. The method of claim 11 wherein the step of applying one or more tire components to the tire building drums at each of the work stations includes:

applying the tire components to the tire building drums while maintaining the axis of rotation through the tire building drums at the constant predetermined height and location and in parallel co-linear alignment with the working axis, and while maintaining the precise longitudinal position along the working axis for the tire building drum.

14. The method of claim 13 wherein the step of applying one or more tire components to the tire building drums at each of the work stations includes:

providing one or more application drums at each of the work stations for applying the tire component(s) to the tire building drums.

15. The method of claim 14 including the step of:

moving the application drums from their normal retracted position away from the working axis to a location where the tire components cart be applied to the tire building drums while maintaining the axis of rotation through the tire building drums at the constant predetermined height and location and in parallel co-linear alignment with the working axis, and while maintaining the precise longitudinal position along the working axis for the tire building drum.

16. The method of claim 15 including the step of:

retracting the application drums at each of the work stations to their normally retracted position, prior to advancing the tire building drums to the next work station.

* * * * *